Patented June 22, 1943

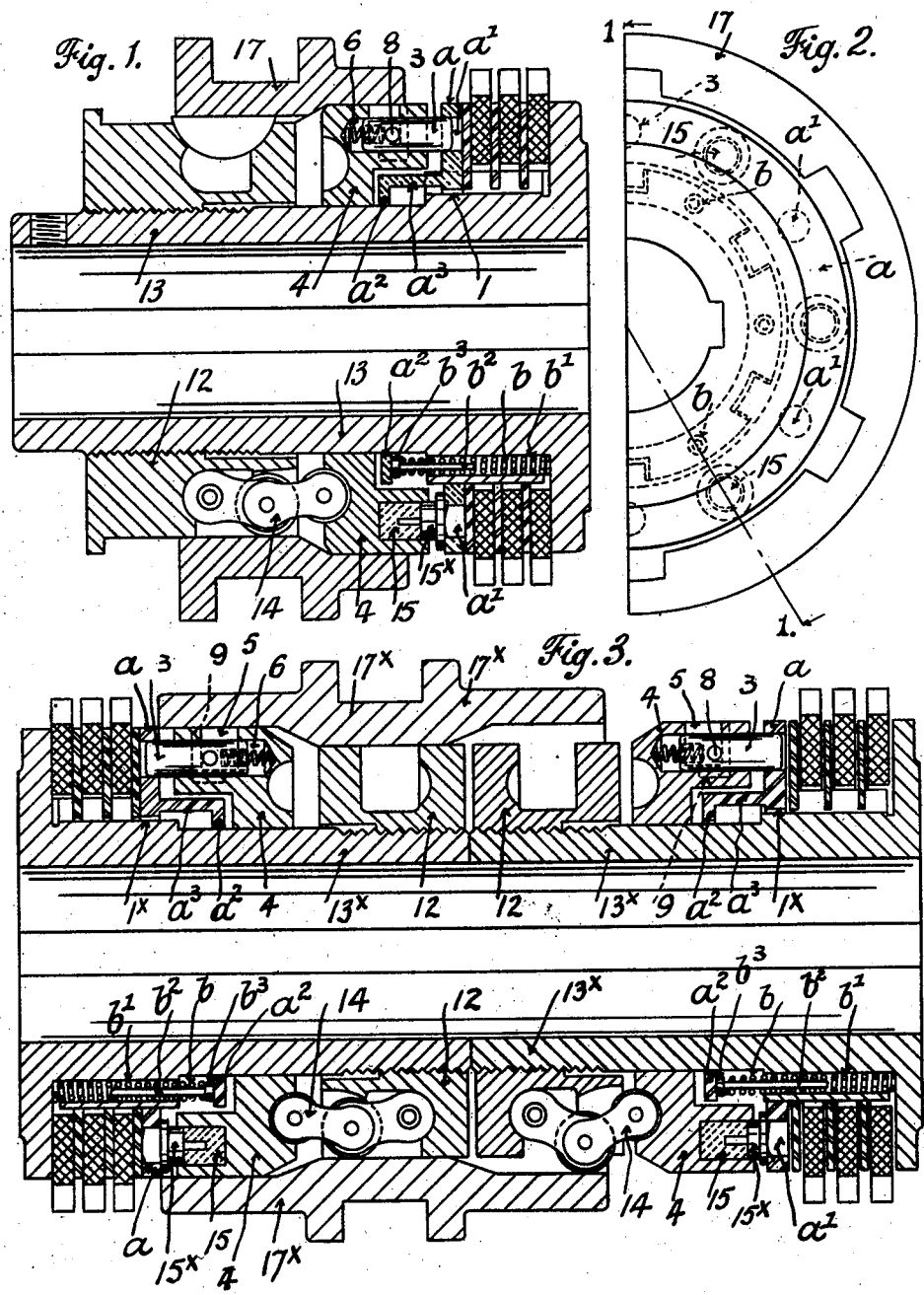

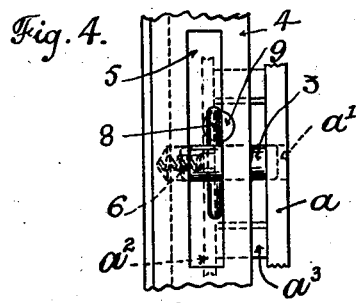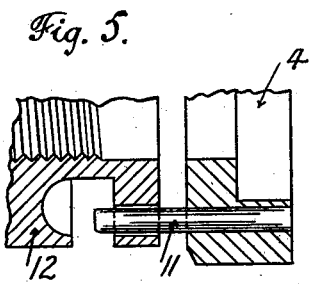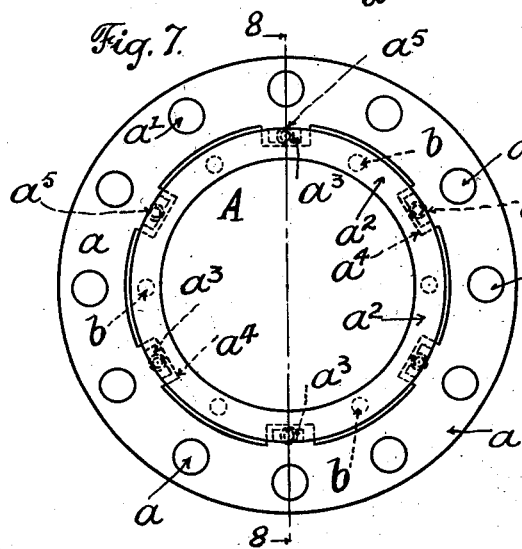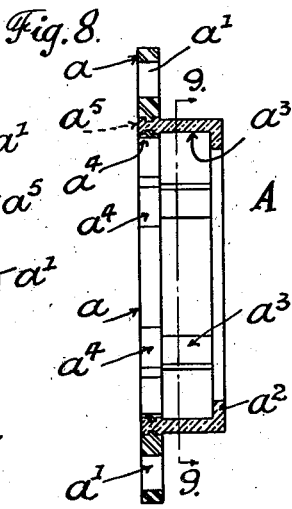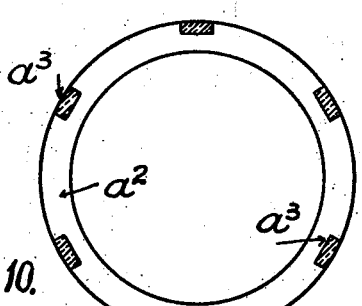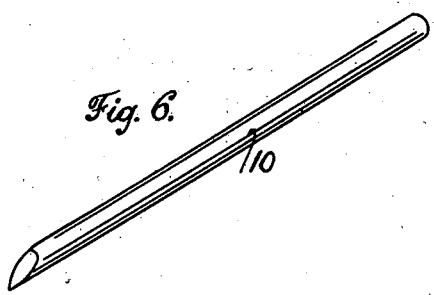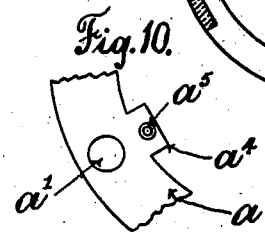

2,322,326

UNITED STATES PATENT OFFICE 2,322,326

FRICTION CLUTCH

Leonard Taylor, Rochdale, England

Application May 29, 1942, Serial No. 444,971
In Great Britain June 21, 1941

4 Claims. (Cl. 192—69)

This invention relates to improvements in or connected with friction clutches of the kind in which end-on pressure is imparted through circumferentially spaced toggle link elements (acted on by a slidable striking sleeve) to a pressure sleeve acting indirectly on a succession of cooperating castellated discs to effect clutching between inner and outer clutch halves, and in which de-clutching takes place on removal of the end-on pressure.

This type of clutch is described or referred to in British patents of mine numbered 393,703, 457,206 and 530,919 and U. S. Patent 1,960,092.

In clutches produced by me according to said patents, or certain of such, I have made use of a simple form of locking plate splined upon a castellated sleeve or the like forming part of the body of the clutch, and such locking plate had spaced or locating holes, and was adapted to be pressed upon or relieved by a slidable pressure sleeve acted upon by circumferentially spaced toggle link elements. These spaced or locating holes were adapted to be engaged by a partly housed locking spindle located in the pressure sleeve which spindle was adapted to be withdrawn, to allow the pressure sleeve to be rotated by a "tommy" bar. When this was done, the pressure sleeve was turned, and, through a dowel, turned the adjusting sleeve or nut on a screwthreaded inner or main sleeve so that the partly housed locking spindle was brought into register with a succeeding hole in the locking plate and setting-up or adjustment of the parts to the castellated discs was effected, including advancement of the circumferentially spaced toggle link elements.

The present invention is mainly concerned with an improved locking plate device, or rather a cage-like structure for clutches of the kind referred to, and to an improved arrangement or disposition of the coiled springs intended to co-operate therewith, and whereby the improved locking plate device or cage-like structure is definitely held-up to the pressure sleeve or devices fitted therein and the locking spindle securely held in any particular locating hole in the locking plate element of said cage-like structure.

An important object of this present invention is to prevent wandering of the locking plate and any possibility of the locking spindle becoming disengaged from the locking plate following wear or unauthorized movement and also to improve the spring arrangement which co-operates with the cage-like structure.

The improvements are illustrated in the accompanying drawings, wherein:

Fig. 1 is a section of a single type clutch of the character to which the improvements apply, the figure illustrating the application of the improvements to the structure of the clutch, the section being taken on the line 1—1 in Fig. 2 looking in the direction of the arrow tips.

Fig. 2 is an end view of one half of the clutch seen in Fig. 1, looking from the right-hand end.

Fig. 3 shows a section of a double action type of clutch of the character mentioned and with the present improvements duplicated and shown combined with each inner half of the clutch. The exterior clutch halves are not shown in Figs. 1 to 3, same being known.

Fig. 4 is a broken detail view showing the guided locking spindle located in the pressure sleeve, and which spindle is adapted to be withdrawn from the locking plate by a "tommy" bar when adjustment or setting-up of the pressure sleeve, etc., is to be made as hereinafter explained.

Fig. 5 shows a broken detail view representing the interconnecting dowel, part of the pressure sleeve, and part of the adjustable sleeve or nut between which and the slidable pressure sleeve, the circumferentially spaced toggle link elements operate.

Fig. 6 shows a "tommy" bar to be looked at with relation to Fig. 4.

Fig. 7 is a face view of an approved construction of the improved locking plate or cage-like structure.

Fig. 8 shows a section of the same taken on the line 8—8, Fig. 7, looking in the direction of the arrow tips.

Fig. 9 is a section of Fig. 8 taken on the line 9—9, looking in the direction of the arrow tips.

Fig. 10 is a broken detail view showing one of the lugs on the steel locking plate or ring.

According to this present invention, in place of the aforementioned simple locking plate described in the aforesaid patents, or certain of them, I use a cage-like structure well illustrated in the drawings, and, according to an approved construction, separately by the Figs. 7, 8, 9. This cage-like structure, indicated as a whole by the reference letter A, combines in its structure the steel locking plate or ring, marked $a$, with its uniformly spaced locating holes $a^1$. To the rear of this steel locking plate or ring $a$ is secured a ring $a^2$ of smaller diameter and spaced therefrom by distance pieces or intermediate webs $a^3$ which two interconnected ring-like elements $a$, $a^2$ produce the cage-like structure A.

The steel locking plate $a$ is fashioned as to its interior circumference in manner to provide spaced keys so that the cage-like structure A can be splined upon its castellated internal supporting sleeve 13 or 13x forming part of the clutch assembly, as is pointed out by the numeral 1 in Fig. 1, and by the numerals 1x, 1x in Fig. 3. The smaller diameter ring $a^2$ and the distance pieces or intermediate webs $a^3$ may be and advantageously is, a non-ferrous casting, cast on the machined steel ring $a$, and such a construction is clearly shown by the Figs. 7 and 8, wherein the steel locking plate $a$ with bored locating holes $a^1$ and the six interior steel lugs $a^4$ (see Figs. 7, 8 and 10) form one entity. The steel lugs $a^4$ are bored at $a^5$, and the smaller diameter ring $a^2$ is cast in brass or non-ferrous metal and so that the extremities of the distance pieces or intermediate ribs $a^3$ attach themselves by the casting operation, and the non-ferrous metal fills and engages the bored holes $a^5$. The said interior lugs $a^4$ being of steel act as keys for splining purposes and project inwards from the interior circumference of the steel locking plate $a$ of the cage-like structure A. Consequently these steel lugs $a^4$ acting as keys sustain the load on the cage-like structure A. By the indicated fashioning and casting of the improved locking plate or cage-like structure A, it is possible to readily and cheaply fashion said structure, and the procedure described obviates expensive machining processes as against producing an all steel cage-like structure A.

In one of the spaced locating holes $a^1$ of the improved locking plate or cage-like structure A, the spring-pressed locking spindle 3 is adapted to engage and according to required adjustment from time to time. The Fig. 4 may now be referred to, where in the pressure sleeve is marked 4 with its shallow cavity 5, the locking spindle 3 being disposed at right-angles to said cavity 5 and having its rear end acted upon by a spring 6 located in a bored guiding cavity in the pressure sleeve and a bored cavity in the rear end of said locking spindle 3, the forward movement of said locking spindle 3 being limited by a cross-pin 8. The said locking spindle 3 is adapted to be retracted against the action of the spring 6 to withdraw its forward end from engagement with any one of the spaced locating holes $a^1$ to allow the pressure sleeve 4 to be turned or advanced to bring the locking spindle 3 into alignment with a further locating hole $a^1$ in the locking plate $a$ of the cage-like structure A.

To effect this operation, a tommy hole 9 is provided in the pressure sleeve 4 into which a "tommy" bar 10 with tapered end (shown at Fig. 6) can be thrust to act on the cross-pin 8 so as to retract the locking spindle 3 against the action of the spring 6.

In order that the turning of the pressure sleeve 4 may effect the requisite set-up or advancement on its rotation due to actuation by manipulation of the "tommy" bar 10, a dowel pin 11 projecting from the pressure sleeve 4 engages and is slidable (all in known manner) in a hole bored in an adjustable sleeve or nut 12 mounted on the screw-threaded main sleeve 13 or sleeves 13x of the clutch structures, the pressure sleeve 4 and adjustable sleeve or nut 12 being separately illustrated at Fig. 5. Thus rotation of the pressure sleeve 4 actuates and advances the adjustable sleeve or nut 12 to take up wear.

It will be seen from Figs. 1 and 3, that the circumferentially spaced toggle link elements 14 operate circumferentially at spaced intervals between the adjustable sleeves or nuts 12 and the pressure sleeves 4 as illustrated, and in similar fashion to what is described in the British and U. S. patents before mentioned.

The provision of the smaller diameter ring $a^2$ of the locking plate or cage-like structure A presents an inner ring or flange against which spaced coiled springs $b$ disposed in pockets $b^1$, bored at spaced intervals in the inner main sleeve 13 or sleeves 13x of the clutch, can press to exert a uniformly distributed pressure. Such springs $b$ advantageously surround spindles $b^2$ and bear on pads $b^3$, the said pads $b^3$ abutting to the inner annular face of the smaller diameter ring $a^2$ of the locking plate or cage-like structure A. When adjustment takes place, on turning the pressure sleeve 4 by engaging the "tommy" bar 10 in hole 9 to press back cross-pin 8, said springs $b$ are not disturbed circumferentially of the cage-like structure A because the pressure sleeve 4 does not bear directly on the springs $b$, the smaller diameter ring $a^2$ intervening. The drawings indicate the use of six spiral springs $b$ (see Figs. 2 and 7).

The improved arrangements described and illustrated enable the resilient buffers 15 (fully described in British Patent 530,919) to be applied to each pressure sleeve 4 and the protruding metallic parts thereof 15x bear against the steel face of the locking plate of the cage-like structure A.

The locking plate or cage-like structure A facilitates free rotary movement of the pressure sleeve 4 for adjusting purposes and ensures the locking spindle having an effective hold in any one of the provided locating holes $a^1$, because said locking plate or cage-like structure A is firmly pressed or held by spring pressure against the resilient buffer devices 15, 15x located in the pressure sleeve 4.

The resilient buffers 15, 15x cannot work out of place, and mechanical noise is not set-up because the locking plate or cage-like structure A is elastically and uniformly backed-up and has very restricted and controlled power of end-on movement.

The locking plate or cage-like structure A provides, in practice, a beneficial assembly with effective supporting ring or surface $a^2$ for the protruding ends of the springs $b$.

The locking plate or cage-like structure A can be made as a complete entity fashioned wholly in steel from one or more parts to the construction described; but it is advantageously and cheaply produced from two parts (steel and non-ferrous metal), the latter cast on the former in manner already described.

The improvements are suited to single, or double type of clutches constructed and working after the manner described in one or other of the before-mentioned specifications, and as illustrated herein.

I have not considered it necessary to describe the action of the castellated disc type of clutches illustrated, such being known, but have illustrated by Fig. 1 a single castellated disc-type clutch referred to herein and a double castellated disc-type clutch by Fig. 3, and my improvements are shown combined in the two examples of clutch which are illustrated.

In the clutches illustrated herein, by Figs. 1 and 3, it will be understood that the circumferentially spaced toggle like elements 14 are brought into and allowed to go out of action, by end-on movement of the slidable striking sleeves marked 17, 17ˣ, as known.

I declare that what I claim is:

1. In friction clutches having castellated discs brought into action by a pressure sleeve operated by circumferentially spaced toggle link elements actuated by a sliding striking sleeve, a cage-like structure comprising a steel locking plate, spaced locating holes in said plate, a smaller diameter ring spaced from said plate, spacing webs interconnecting said plate and ring, steel lugs on the inner circumference of said plate, a castellated support sleeve forming part of the clutch, said lugs adapted to spline the cage-like structure on said castellated support sleeve, spaced pockets in said support sleeve, and spiral springs located in said pockets in said support sleeve, said spiral springs adapted to exert pressure on the aforesaid smaller diameter ring of the cage-like structure, all for the purposes described.

2. In a friction clutch as described herein, an arrangement of two sets of cage-like structures each comprising a steel locking plate with spaced locating holes in said plate, and a smaller diameter ring spaced from said plate, spacing webs interconnecting said plate and ring, steel lugs on the inner circumference of said plate, and castellated support sleeves forming part of the clutch, said lugs adapted to spline the cage-like structures on said castellated support sleeves, spaced pockets in said support sleeves, and spiral springs located in said pockets in said support sleeves, said spiral springs adapted to exert pressure on the inner face of the aforesaid smaller diameter rings of the cage-like structures, all for the purposes described.

3. In combination in friction clutches as described and shown herein, cage-like structures which comprise a steel locking plate, spaced locating holes therein, a smaller diameter ring spaced from said plate, spacing webs interconnecting said plate and ring, steel lugs on the inner circumference of said plate, a castellated support sleeve forming part of the clutch, said lugs adapted to spline the cage-like structure upon said castellated support sleeve, spaced pockets in said support sleeve, and spiral springs located in said spaced pockets in said sleeve, said springs being furnished with a spindle and pad and adapted and arranged to exert pressure on the interior face of the smaller diameter ring of said cage-like structure for the purposes and as described.

4. In friction clutches as described herein and having cage-like structures and spring arrangement as claimed in claim 1, the modified cage-like structure fashioned in two halves, one half a steel plate, and the other half consisting of a spaced smaller diameter ring with interconnecting webs joining said smaller diameter ring to said steel plate, as described.

LEONARD TAYLOR.